United States Patent [19]

Wolber

[11] 3,717,789

[45] Feb. 20, 1973

[54] CIRCUIT ARRANGEMENT FOR CORRECTING THE DEFLECTION OF AN ELECTRON BEAM

[75] Inventor: Jorg Wolber, Hamburg-Stellingen, Germany

[73] Assignee: U.S. Philips Corporation, New York, N.Y.

[22] Filed: Dec. 3, 1970

[21] Appl. No.: 94,853

[30] Foreign Application Priority Data

Dec. 13, 1969 Germany....................P 19 62 569.5

[52] U.S. Cl...................315/26, 315/24, 315/27 XY, 315/28

[51] Int. Cl..............................................H01j 29/76

[58] Field of Search......315/24, 26, 27 R, 27 XY, 28

[56] References Cited

UNITED STATES PATENTS

| | | | |
|---|---|---|---|
| 3,329,861 | 7/1967 | Barkow et al. | 315/24 |
| 3,408,535 | 10/1968 | Lemke | 315/24 UX |
| 3,237,048 | 2/1966 | Slavik | 315/24 X |
| 3,329,859 | 7/1967 | Lemke | 315/26 X |
| 3,447,027 | 5/1969 | Kramer | 315/27 R X |

*Primary Examiner*—Benjamin R. Padgett
*Assistant Examiner*—E. E. Lehmann
*Attorney*—Frank R. Trifari

[57] ABSTRACT

A circuit arrangement for the East-West correction in a picture display apparatus by means of a transductor which is controlled by a current of field frequency and whose power winding is connected in series with the line deflection coils. A field frequency variation of the flyback pulses and hence of the EHT is prevented because flyback pulses generated by the power winding are also applied to the EHT rectifier.

4 Claims, 4 Drawing Figures

Figure 1:
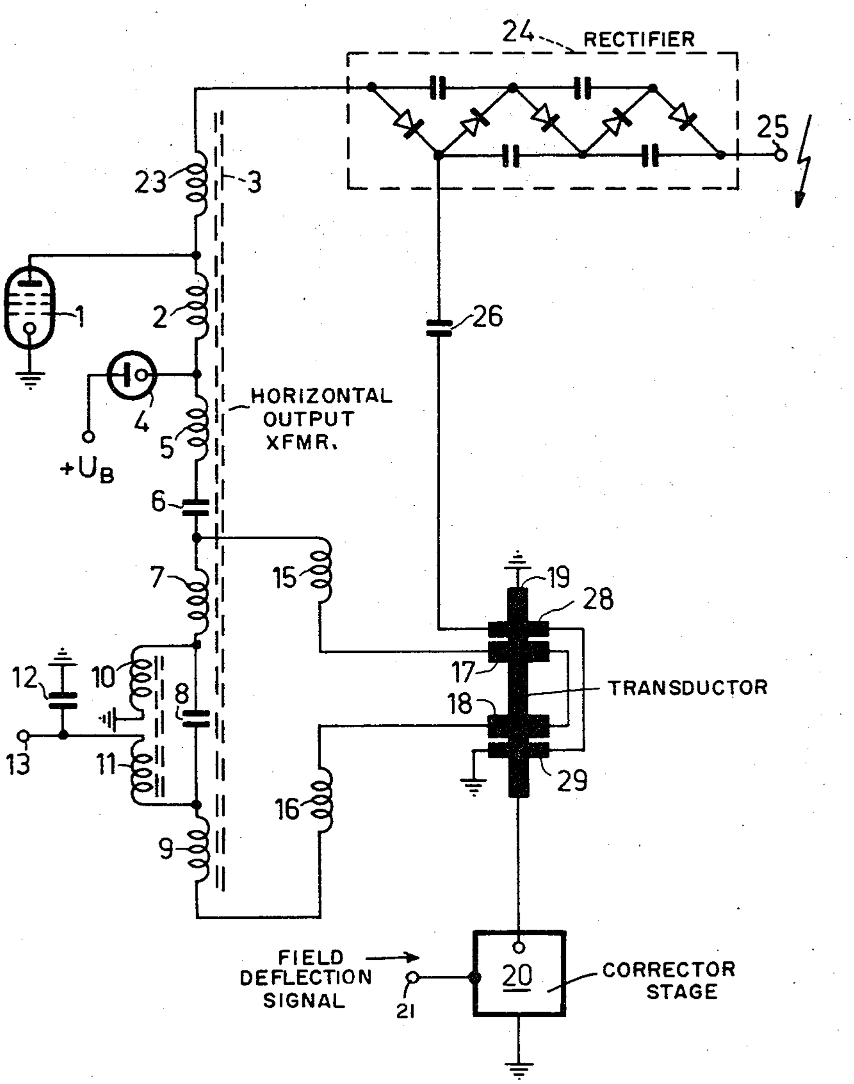

INVENTOR.
JÖRG WOLBER
BY
AGENT

INVENTOR.
JÖRG WOLBER
BY Frank R. Trifari
AGENT

CIRCUIT ARRANGEMENT FOR CORRECTING THE DEFLECTION OF AN ELECTRON BEAM

The invention relates to a circuit arrangement for correcting the deflection of an electron beam in a picture display tube which forms part of a display apparatus including a line deflection generator, a field deflection generator and a line flyback EHT rectifier having a charge capacitor, by means of a transductor whose power winding is connected in series with the coils for the line deflection and whose control winding receives a parabolic current of field frequency.

Such a circuit arrangement is described in U.S. Pat. No. 3,329,861 in which the line deflection current is modulated at the field frequency by means of a transductor in order to correct the generally pincushion-like raster distortion in the horizontal direction, the so-called East-West distortion. However, it is found that not only this desired modulation is established, but also an unwanted modulation of the line flyback pulses occurs. The variation in the inductance of the transductor which is caused by variation of its control current exerts influence on the total energy which is stored in the line deflection circuit and, as is known, the amplitude of the flyback pulses depends on this energy. The EHT derived from these pulses and required for the final anode of the picture display tube is thus likewise modulated which is visible as a modulation in brightness on the screen of the picture display tube. In addition, modulation of the EHT results in the amplitude of the line deflection being influenced thereby so that a raster distortion dependent on the beam current may occur.

Thus, the EHT varies in the rhythm of the field frequency control signal of the transductor and could in principle be smoothed in a conventional manner, for example, with the aid of capacitors. However, since these capacitors would have to stand a voltage of, for example, approximately 25 kV, such a solution would be very expensive. In the U.S. patent specification referred to steps have been taken to obviate this drawback while using a rather complicated transductor. An object of the present invention is to compensate the variation in the EHT and to this end the circuit arrangement according to the invention is characterized in that pulses generated by the power winding are joined to the line flyback pulses applied to the EHT rectifier so that the resultant pulses do not contain substantially any component of field frequency.

The invention is based on the recognition of the fact that flyback pulses are present in the power winding of the transductor, the amplitudes of these pulses undergoing a variation as a function of the control current of field frequency, which variation as compared with the variation of the flyback pulses applied to the EHT rectifier is opposite. Thus, when these flyback pulses are, for example, added together in a suitable manner, this variation can be eliminated at least approximately.

For completeness'sake it may be noted that it is known from the Netherlands Pat. application 6904658 to stabilize the EHT against variations caused by variations of the load connected thereto by means of a variable inductor which is connected to the EHT winding of the line output transformer and whose variation is a function of the load. A transductor may be used for this purpose, so that also the line deflection stage and the control circuit are relatively decoupled, which is desirable. However, according to the invention, the line deflection circuit is not affected because a winding of the transductor, which is present anyway for the raster correction, is incorporated in the EHT rectifier circuit.

Figure 2A:
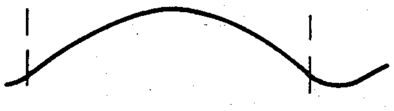
Figure 2B:
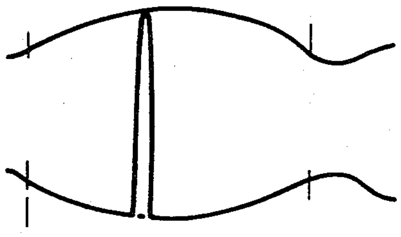
Figure 2C:
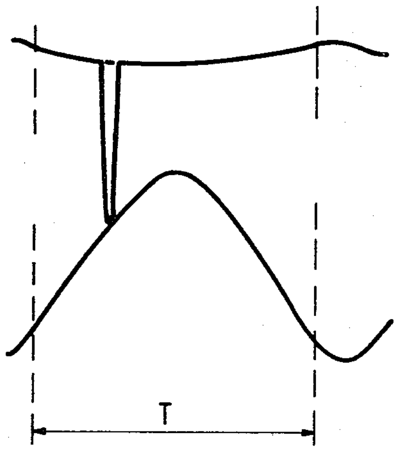

In order that the invention may be readily carried into effect, an embodiment thereof will now be described in detail by way of example with reference to the accompanying diagrammatic drawings in which:

FIG. 1 shows a simplified principle circuit diagram of an embodiment of the circuit arrangement according to the invention, and FIGS. 2*a*, 2*b* and 2*c* show waveforms of the signals which occur in the circuit arrangement according to FIG. 1.

An output pentode 1 drives a suitable current through the primary winding 2 of the output transformer 3 of the horizontal deflection circuit of a picture display apparatus (FIG. 1). The other end of winding 2 is connected through an efficiency diode 4 to the positive terminal of a supply source whose negative terminal is connected to earth. Furthermore the series arrangement of a winding 5, the booster capacitor 6, a first secondary winding 7, a capacitor 8 for the so-called S-correction and a second secondary winding 9 is connected to the junction of winding 2 and diode 4. The other end of winding 7 is connected to earth through the first winding 10 of a bifilarly wound coil, while the second winding 11 thereof is connected to the junction of winding 9 and capacitor 8. The other end of winding 11 is connected to earth through a capacitor 12 and constitutes a terminal 13 to which a current for the centering of the picture displayed may be applied.

The deflection coil halves 15 and 16 are connected to the ends of secondary windings 7 and 9 remote from each other and are connected together through the power windings 17 and 18 of a transductor. One end of a control winding 19 of the transductor is connected to earth while the other end thereof receives a current of field frequency originating from a corrector stage 20. The input terminal 21 of stage 20 connects this stage to the field deflection circuit (not shown).

An EHT winding 23 which drives a voltage multiplication rectifier 24 is connected to the end of winding 2 which is shown on the upper side in FIG. 1. This winding provides the EHT for a terminal 25, while a charge capacitor 26 is connected to earth.

The circuit arrangement described so far is known in the art.

According to the invention rectifier 24 is not only controlled by the pulses from winding 23 but also by pulses which are derived from auxiliary windings 28 and 29 which auxiliary windings are tightly coupled to power windings 17 and 18. These pulses are applied to the connection of capacitor 26 remote from rectifier 24 in such a manner that they are superimposed on the pulses generated by windings 5, 2 and 23 so that the resultant voltage substantially does not vary.

The foregoing may be explained with reference to FIG. 2. The current of field frequency (FIG. 2*a*) supplied by corrector stage 20 to control winding 19 is parabolic, the maximum being reached at the middle of the field scan period T and the difference between this maximum and the substantially equal values at the beginning and the end of the same period being dependant on the extent of the required correction. The said maximum of the control current and the number of turns on winding 19 are chosen to be such that the core of the transductor is saturated. The inductance of power windings 17 and 18 therefore will have a minimum value at the middle of the field scan period at which instant the line deflection current reaches its maximum.

FIG. 2*b* represents the envelope of field frequency of the positively directed line flyback pulses which are applied to rectifier 24. This envelope has substantially the same shape as that of the line deflection current flowing through line deflection coil halves 15 and 16. Auxiliary windings 28 and 29 are wound in such a manner that the pulses which are produced thereacross during the line flyback period are negatively directed and have a parabolic envelope of field frequency as is shown in FIG 2c. This envelope is at a maximum at the beginning and the end of the field scan period T, that is to say, it undergoes a variation which is opposite to that of the envelope of the pulses of FIG 2*b*. When charge capacitor 26 is connected to winding 28 the first diode in rectifier 24 is rendered conducting both by the pulses according to FIG. 2*b* and by the pulses according to FIG. 2*c*, so that the voltage present at the junction of EHT winding 23 and rectifier 24 is the result of superposition of both. By suitable choice of the ratio between the two voltages it may be achieved that the resultant line flyback pulses do not undergo substantially any modulation of field frequency so that the EHT is not modulated either.

It may be noted that circuit arrangements are known in which a transductor connected in parallel with the line deflection coils or a combination of a parallel and a series transductor is used. In such a case the voltage across the deflection coils remains substantially constant while the current flowing therethrough is modulated. The principle of the present invention may be used in this respect, too, if the transductor current flows through the primary winding of a transformer. In that case a voltage which is suitable for the compensation of the EHT may be derived from a secondary winding of this transformer.

The principle of the invention maybe alternatively used, when the EHT rectifier is not a multiplier, but a singlefold rectifier. However, in this case there is generally no actual charge capacitor available such as is capacitor 26 of FIG. 1. Nevertheless it does not make sense to connect the conducting cladding of the picture tube, whose distributed capacitance to the ambiance fulfills the function of a charge capacitor, to a variable potential through windings 28 and 29. It is possible to connect these windings optionally through a capacitor to the junction of windings 2 and 23. This is, for that matter, alternatively possible in the case of multiplier.

What is claimed is:

1. A circuit comprising a line deflection generator comprising a line output transformer having a flyback winding; a rectifier means coupled to said flyback winding for generating the ultor voltage of a cathode ray tube; a pair of line deflection coils coupled to said transformer; means for correcting pincushion distortion in said tube comprising a transductor having a control winding means for receiving a parabolic signal of field frequency and a power winding coupled to said deflection coils, whereby said ultor voltage parabolically varies at said field frequency in a selected sense; and means for eliminating said parabolic variations from said ultor voltage comprising means for applying a portion of the power winding signal to said rectifier in a sense opposite to said selected sense.

2. A circuit as claimed in claim 1 wherein said applying means comprises an auxiliary winding tightly coupled to said power winding, and a capacitor coupled between said auxiliary winding and said rectifier.

3. A circuit as claimed in claim 1 wherein said applying means comprises an auxiliary winding tightly coupled to said power winding and a capacitor means coupled between said auxiliary and flyback windings for effecting a series coupling therebetween.

4. A circuit as claimed in claim 1 wherein said power winding and said deflection coils are series coupled.

* * * * *